United States Patent [19]
Stohr

[11] 3,763,345
[45] Oct. 2, 1973

[54] METHOD OF ELECTRONIC BEAM WELDING

[75] Inventor: Jacques Andre Stohr, Hures-aur Ivette, France

[73] Assignee: Commissariat A L'Energie Atomique, Paris, France

[22] Filed: Sept. 13, 1972

[21] Appl. No.: 288,539

Related U.S. Application Data

[63] Continuation of Ser. No. 140,212, May 4, 1971, abandoned.

[30] Foreign Application Priority Data
May 6, 1970 France .................................. 7016664
July 15, 1970 France .................................. 7026059

[52] U.S. Cl. ......................................... 219/121 EM
[51] Int. Cl. ............................................. B23k 15/00
[58] Field of Search ............... 219/121 EM, 121 EB, 219/137; 250/49.5 TZ

[56] References Cited
UNITED STATES PATENTS
2,902,583  9/1959  Steigerwald.................. 219/121 EM
3,376,419  4/1968  Schumacher ................ 219/121 EM
3,518,400  6/1970  Gallivan...................... 219/121 EM Primary Examiner—R. F. Staubly
Assistant Examiner—Gale R. Peterson
Attorney—William B. Kerkam, Jr.

[57] ABSTRACT

Electron beam welding uses at least one electron beam having components of constant specific power, measured in the direction opposite to the displacement of said beam, which vary between predetermined values within the electron impact area.

6 Claims, 28 Drawing Figures

METHOD OF ELECTRONIC BEAM WELDING

This is a continuation of application Ser. No. 140,212 filed May 4, 1971, now abandoned.

This invention relates to an improvement in the method of show beam welding which, by making use of components of constant specific power which vary in a predetermined manner within the area of electron-beam impact, makes it possible to obtain a more uniform weld, an improved flow of the metal within the cavity formed by the electron impact and generally to obtain minimizaton both of shrinkage and of the weld fillet as well as elimination of microcavities which are liable to appear in the weld zone according to welding conditions when making use of an emitting device having axial symmetry or in other words a practically homogeneous distribution of the power over the impact area.

Moreover, in the case of butt welding of metallic parts and especially in the case of parts to be assembled on site, the use of electronic beam welding can become difficult or even impossible with the techniques which are known at the present time when the opposite surfaces are brought into contact with an insufficient degree of precision. Imperfections in trueing of sections and in the case of butting of tubes, for example, differences in diameter and defects such as ovalization or displacement off-center can contribute to the formation of projections, local underthickness or overthickness and so forth which are hardly or not at all compatible with the execution of a thin welded joint of the type which permits the use of electronic beam welding (axial symmetry) in accordance with the methods which have been employed up to the present time.

By reason of the increasing industrial significance of this problem, a number of different expedients have been proposed ; for example, the addition of metal prior to formation of the resistant weld proper, the successive utilization of arc welding in a shielded or unshielded atmosphere with or without filler metal and of electronic beam welding, etc. However, up to the present time, none of the practicable methods has really made it possible to benefit by the economy of a weld performed in a single pass without being too closely dependent or penetration and welding speed, these two characteristics in conjunction with the quality of the weld and the reliability of the result being such as to constitute the main industrial advantages of electronic beam welding which is to be considered in the present instance.

This invention is intended to eliminate or at least to minimize the disadvantages carried by methods of the prior art by substituting for a beam having a complete axial symmetry subject to instrumental distortions at least one beam having components of constant specific power which vary in a predetermined manner along the impact area of said beam.

In the electronic beam welding process, it is known that the electron beam having a specific power $W/S$ hollows-out at the point of junction of the parts to be welded a hole having a penetration depth which is related to the nature of the material, to the specific power $W/S$, to the welding speed $v_s$. It is also known that said hole is filled with the metal which flows from the walls as the beam is displaced.

The existence of said hole has been demonstrated experimentally by applying without displacement of the beam and during a very short period of time a beam having a high specific power which effectively results in the formation of a practically cylindrical hole. At the time of performance of the welding operation, the displacement of the beam results in displacement of the hole and this latter is continuously filled with the metal which flows from the walls. The shape of the molten zone which is characterized by its cross-section in the plane at right angles to the welding line corresponds, all other conditions remaining unchanged, to the shape of the hole which would be created by a stationary beam having a power $W/S$ which produces action as stated in the foregoing. However, the entire quantity of metal which is driven from the hole as a result of electron impact and of the pressure arising from evaporation of the atoms of metal does not return to the cavity which is created by reason of the practically instantaneous solidification of the metal. In regard to the quality of the weld, this results in disadvantages such as shrinkage and microcavities in the molten zone, depending on the weld conditions.

This invention consists in employing at least one electron beam having components of constant varying the specific power of the beam between the leading edge and the other extremity of the impact area so that the molten zone no longer has the geometrical and metallurgical properties which were produced by the cylindrical beams employed in the prior art.

Further properties and advantages of the invention will become apparent from the following description of one embodiment and from the accompanying drawings in which.

Figure 1:
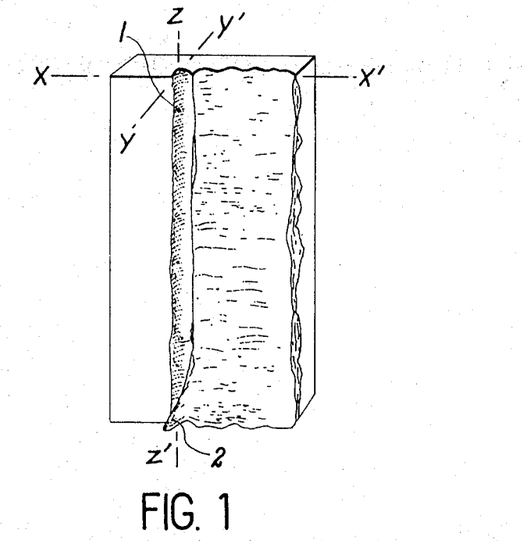
FIG. 1 is an illustration of the weld cavity obtained by sudden stopping of the electron bombardment.
Figure 2:
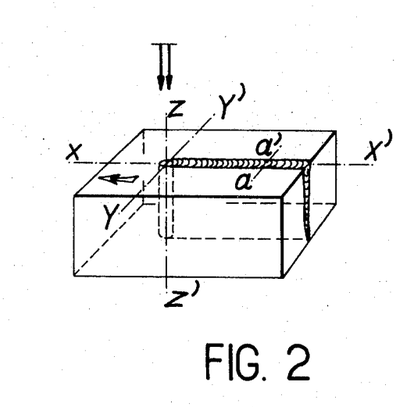
FIG. 2 shows diagrammatically the welding operation, the cavity which is created under the action of the electron impact being displaced in the direction of forward motion of the beam and filled progressively as a result of flow of molten metal.
Figure 2A:
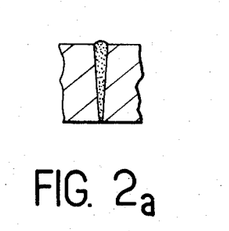
FIG. 2a shows the characteristic cross-section of a conventional weld in the plane YY' — ZZ' at right angles to the welding line XX'.
Figure 3A:
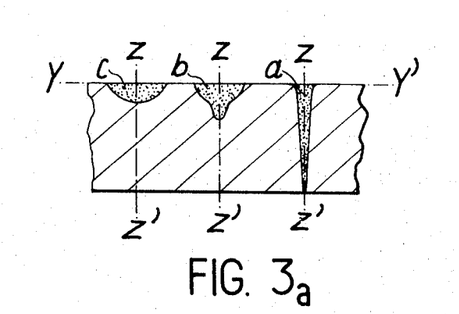
FIG. 3a shows three forms of molten zones obtained by means of three specific powers which are assumed to be decreasing $(W/S)_a > (W/S)_b > (W/S)_c$ all three of which correspond to cylindrical beams.
Figure 3B:
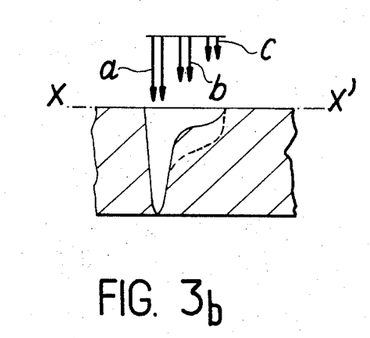
FIG. 3b and 3c represent the superposition of two molten zones respectively in the plane YY' — ZZ' at right angles to the welding line.
Figure 3C:
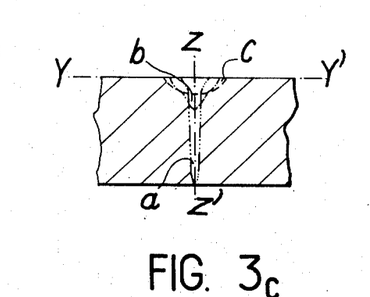
Figure 4A:
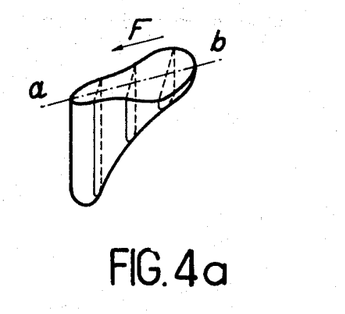
FIGS. 4a, 4b, 5a, 5b, 6a, 6b represent respect-ively the shapes in space of the molten zones corresponding to specific powers which vary between the extremities a and b of the impact zone either when decreasing (FIG. 4) or when increasing (FIG. 5) or when increasing then decreasing (FIG. 6)
Figure 4B:
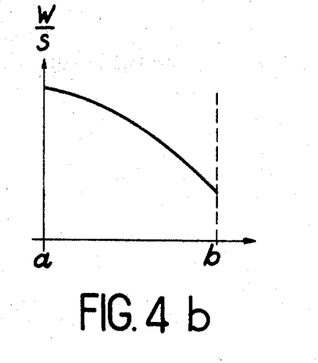
Figures 7A, 7B:
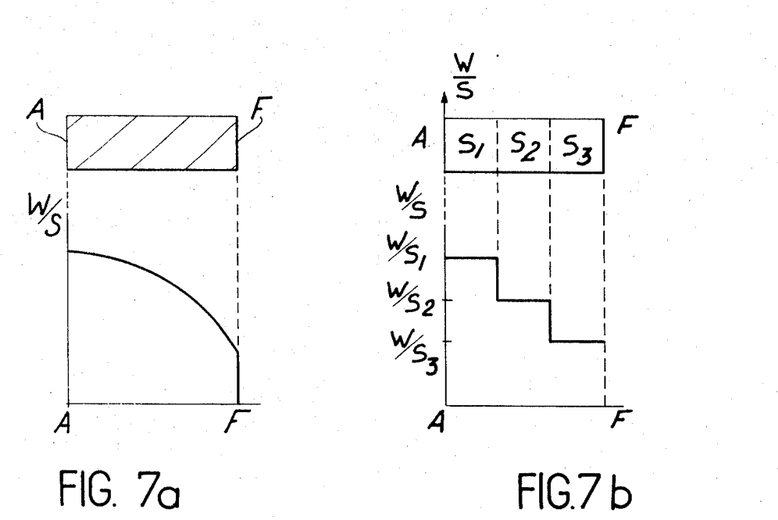
FIGS. 7a and 7b show the correspondence between a continuous decrease and a decrease in steps of the specific power within the interior of an impact zone which is assumed to be rectangular.

Referring now to FIGS. 3, 4 and 7, it is apparent that the decrease in specific power either continuously or in steps within the interior of the electron impact area considerably assists the flow of metal within the cavity created by the impact of electrons corresponding to maximum specific power ; this advantage is defined by a very appreciable reduction and even by elimination of the geometrical defects in the weld such as fillets, shrinkages or microcavities.

In FIG. 3b, the electron beam is moved to the right and has three constant components of specific power C being the weakest, B having increased specific power and A having the greatest specific power. Component C has constant specific power and provides a relatively shallow but wide molten zone shown at C in FIGS. 3a and 3c with a mid line Z–Z'. Component B has constant specific power larger than component C and forms a deeper and narrower molten zone seen at B in FIGS. 3a and 3c having deeper penetration on mid line Z–Z' with movement of the electron beam to the right merging these two molten zones. Component A has constant specific power greater than those of components C and B and forms a still deeper and narrower molten zone as seen at A in FIGS. 3a and 3b on mid line Z–Z'. Movement of the electron beam to the right in FIG. 3b merges zone A with zones C and B to form the completed deep weld seen at the right in FIG. 3a.

The improvement in the conditions of filling of the cavity by an electron beam having components of differing but constant specific power which is related to the novel shape of this latter and consequently of the melting zone in the direction of displacement of the beam is especially favourable to the quality of penetrating welds performed at the high welding speeds which may be required by industrial production.

Figure 5A:
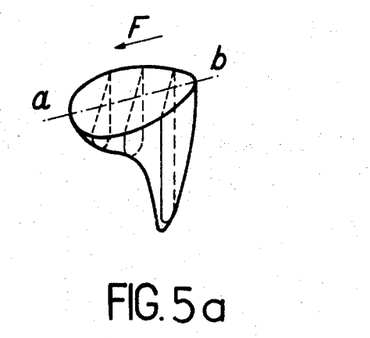
Figure 5B:
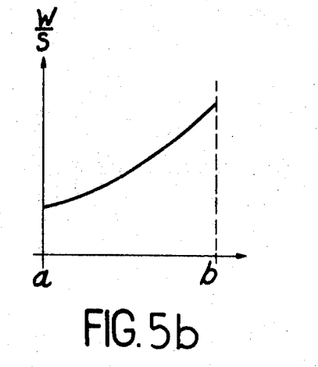
Figure 6A:
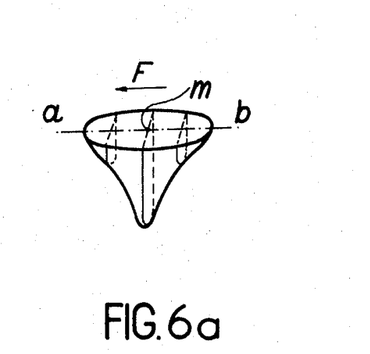
Figure 6B:
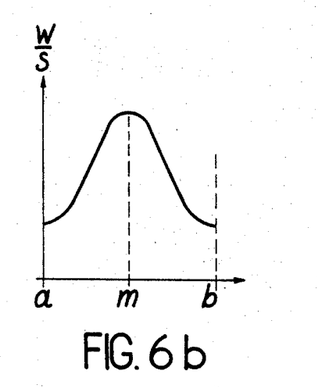
Figure 8:
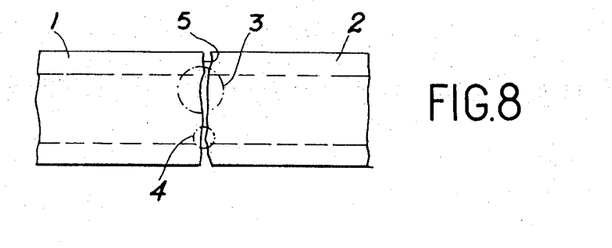
FIGS. 8, 9, 10 and 11 show a particular application of the invention to butt welding of two tubes having defective metal-to-metal contact.
Figure 9:
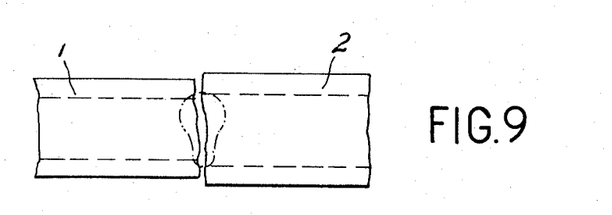

Referring now to FIGS. 5 and 6, it is apparent that the increase in the electron beam from a minimum constant value of specific power in a component of the beam corresponding to a minimum depth of penetration but a relatively wide molten zone to a maximum constant value of specific power in a component of the beam corresponding to the desired maximum penetration followed, for example, by controlled decrease is specific power to a less constant value in another component of the electron beam as previously indicated in FIG. 3, 4 or 7 makes it possible to overcome the defects in metal-to-metal contact between parts to be welded. In this respect, there is shown in FIGS. 8 and 9 by way of non-limitative example the application of the invention to butt welding of two tubes 1, 2 having defective metal-to-metal contact arising from irregularity of cutting and differences in diameter.

Figure 10:
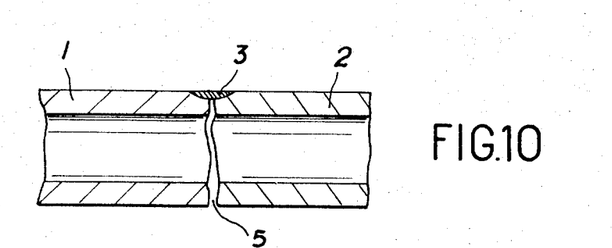
Figure 11:
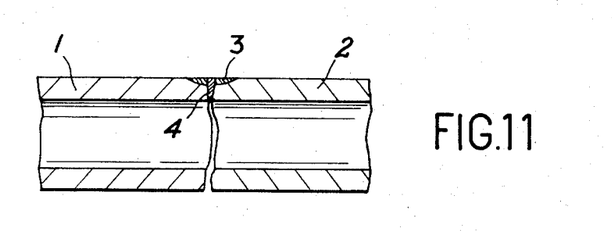

In order to carry out the welded junction by electron beam welding of tubes of this type, as described above, the increase in specific power was obtained by adaptation of two beams emitted by two separate electron guns or more advantageously by means of an electron gun of the bifocus type. The first beam having the lower specific power produces an impact zone 3 located in the direction of displacement and as shown in FIG. 8 in front of the impact zone 4 of the second beam which has the higher specific power. These two zones overlap (as shown in FIG. 9), the overlap being obtainable both by means of two separate electron guns and by means of a single bifocus gun forming an electron beam of constant but different specific power. The zone 3 which has melted under the electron impact of the first beam (FIG. 10) has low penetration but is of relatively substantial width, thereby permitting an initial welded joint between two tubes 1 and 2 between which geometrical imperfections leave a substantial gap 5 and this latter can attain locally a width of 1.5 to 2 millimeters, for example, in respect of tube-wall thicknesses of the order of 10 millimeters. The weld which is then carried out by means of the second beam having a higher power benefits by the addition of the metal 3 which has been melted by the first beam and makes it possible to obtain the desired penetration (FIG. 11). It must be clearly understood that the specific power of the two components of the beam is assumed to be limited to two characteristic values solely in order to ensure easier understanding of the process and the increase from the minimum values to the maximum values to be considered can be effected either continuously or in several steps.

Figure 12:
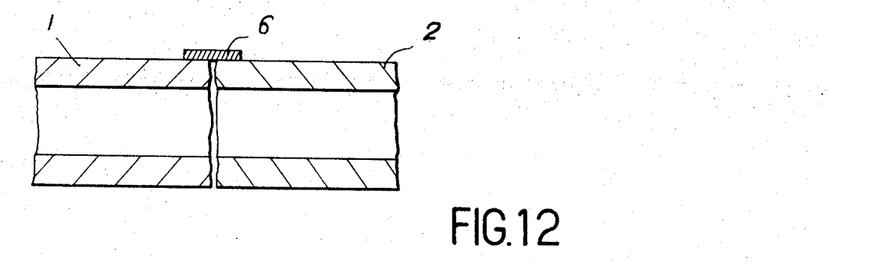
FIGS. 12, 13 and 14 show in the same manner as in the foregoing one application of the invention to butt welding of two tubes but with defective metal-to-metal contact such that an addition of filler metal proves to be necessary.
Figure 13:
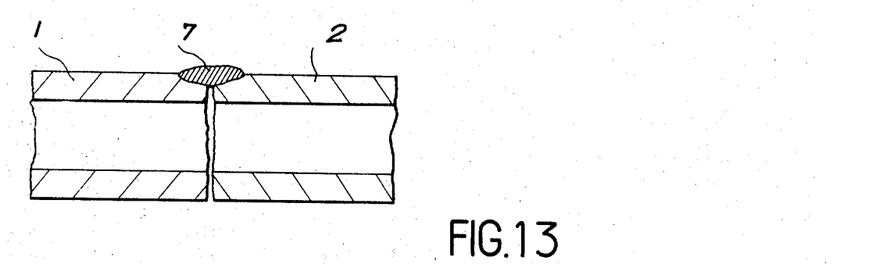
Figure 14:
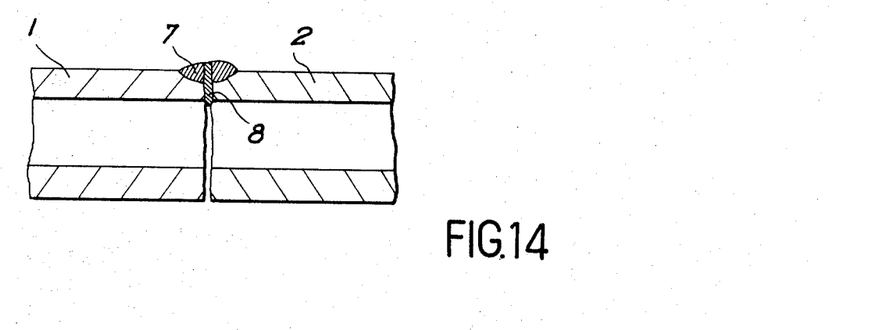

In the case in which the gap is too large to permit the possibility of filling without filler metal, a simple strip 6 (shown in FIG. 12) is wound around the gap and the weld obtained by the same method to obtain sound welds in spite of gaps which can attain local widths of 3 to 4 mm, for example, in respect of wall thicknesses of approximately 10 millimeters. The first beam component which has low specific power results in a slight collapse 7 of the strip along the two opposite edges (as shown in FIG. 13) and over a large area. The second beam component of higher specific power completes the previous surface weld (as shown in FIG. 14) by means of a penetrating weld 8.

Satisfactory results are also obtained by means of the method according to the invention when using tubes having imperfections in metal-to-metal contact in conjunction with differences in diameter of the order of 2 millimeters in respect of a wall thickness of 10 millimeters as already mentioned by way of indication.

It must also be understood that the variation in constant specific power of the component of the electron beam can be combined with the known methods of lateral relative displacement of the electron impact zones and that, in addition, the mean or characteristic line of said zones can be angularly displaced with respect to the direction of metal-to-metal contact or of welding of parts if it should prove necessary, for example, to assist collapse of the highest edge of the joint. The variation in specific power within one or a number of impact areas in fact permits very considerable flexibility of operation in the case of associated electron guns, bifocus or multifocus guns or guns having a variable $W/S$ so as to permit adaptation of a single type of apparatus to the formation of welded joints having very different characteristics.

Figure 15A:
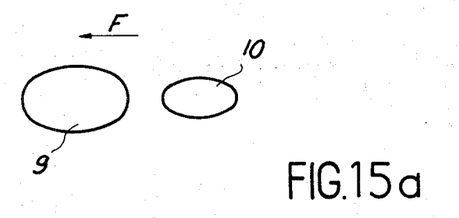
FIGS. 15a, 15b, 15c sw diagrammatically one possible mode of transition between two distinct focal spots and a single spot having either the same type of variation of the specific power or a more complex variation of said power.
Figure 15B:
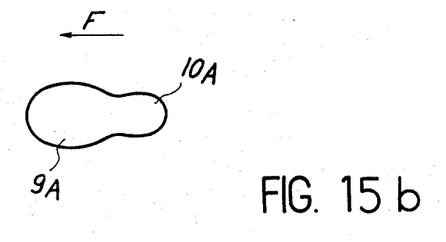
Figure 15C:
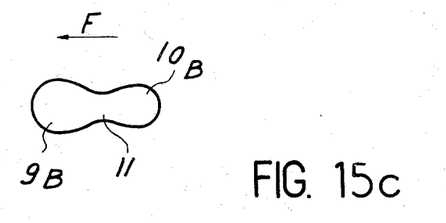
Figure 16:
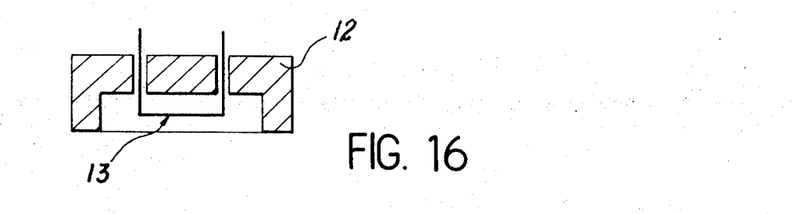
FIGS. 16 to 19 show by way of non-limitative examples simplified diagrams in plan and in cross-section showing models of electron guns for the emission of beams in accordance with one mode of operation of the method.
Figure 17:
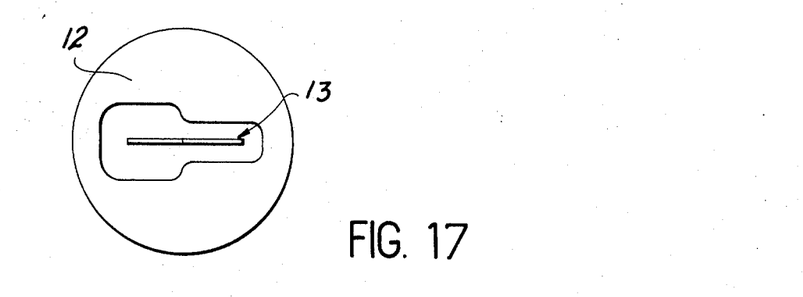

By way of example and with reference to the preceding discussion of FIGS. 8 and 9, there is shown in FIGS. 15a, 15b, 15c the transition between two separate focal spots 9 and 10 having a substantially oval shape in which the respective specific powers $(W/S)_1$ and ($W/S$)$_2$ are of increasing value in the direction opposite to the displacement F of the beams. By moving the spots closer together as a result of elongation of either one spot or the other, for example, produces a single impact surface (shown in FIG. 15b) having within the interior of the zones 9a and 10a a similar distribution of specific powers ($W/S$)$_1$ < ($W/S$)$_2$. An increase in overlap result in the formation of a narrowed impact area forming between the zones 9b and 10b a central portion 11 in which the specific power is of maximum value power variation as seen in FIG. 6b. The values selected both in regard to the leading zone or edge of the beam and in regard to the increased and, maximum value of the central portion of the beam and decrease of value to the trailing edge of the beam being dependent on the desired welding speed, on the nature of the materials, and on the geometrical characteristics of the opposite surfaces. A single adjustment of the beam emitting system thus provides starting, penetration and completion of the weld.

A variation in specific power can be obtained either by making use of electrostatic or electromagnetic means which are known in electron optics or by using multifocus guns, the constructional design of which can readily be derived from the diagrams referred-to hereunder.

Figure 18:
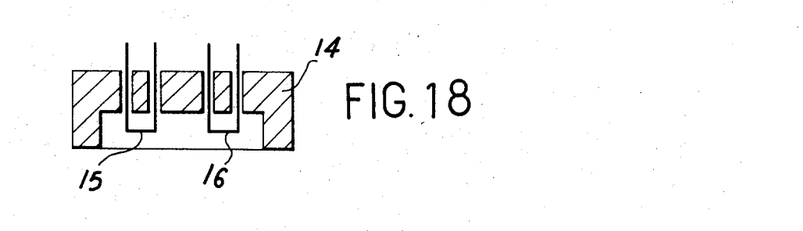
Figure 19:
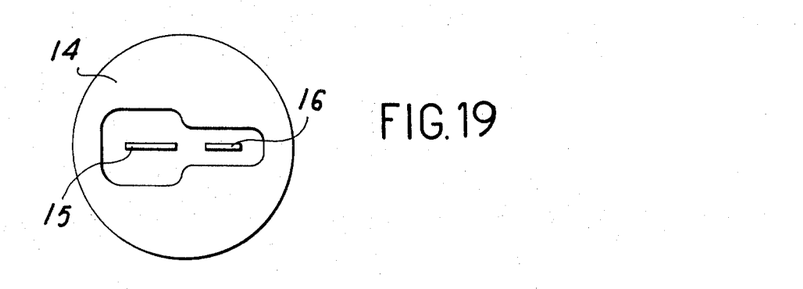

FIGS. 16 to 19 in fact give by way of example in plan (FIGS. 17 and 19) and in cross-section (FIGS. 16 and 18) the diagram of focusing or Wehnelt components (12, 14) which serve to produce beams and consequently impact zones in accordance with the invention by means of two different cathode arrangements which are evidently not limitative and in which one (shown in FIGS. 16 and 17) makes use of a single cathode 13 and the other (as shown in FIGS. 18 and 19) makes use of two cathodes 15 and 16.

Finally, it will be noted that the variation in constant specific power of the beam components can also be related to the shape of the impact area. For example, the distribution over a trapezoidal area of a beam which has a homogeneous constant specific power over a right cross-section results in a progressive increase or decrease in specific power in the impact zone according to the arrangement of the bases of the trapezium with respect to the direction of displacement.

It will be readily understood that the invention is not limited in any sense to the embodiment which has been described with reference to the accompanying drawings and which has been given solely by way of example.

What we claim is :

1. A method of electron beam welding a workpiece including the steps of establishing on electron beam of components each component having a constant specific power different from the specific powers of the other components within the electron impact area; directing said electron beam against the workpiece and moving the beam in the direction of welding.

2. A method as described in claim 1 including the step of adjusting the specific powers of the components to increase from a minimum value to a maximum value in the direction opposite to the direction of welding.

3. A method as described in claim 2 including the further step of adjusting the specific powers of the components to decrease to a lesser value after the maximum value in the direction opposite to the direction of welding.

4. A method as described in claim 1 including the step of partially overlapping the electron impact areas of the components.

5. A method as described in claim 1 including the step of displacing the impact areas of the components angularly with respect to the direction of welding.

6. A method as described in claim 1 including the step of selectively changing continuously and discontinuously the constant specific power of the components from component to component.

* * * * *